United States Patent [19]

Foley, Jr.

[11] 4,218,554
[45] Aug. 19, 1980

[54] PROCESS FOR PREPARING HYDROGEL CONTACT LENSES CONTAINING QUATERNARY AMMONIUM SALTS

[76] Inventor: William M. Foley, Jr., 2551 Sleepy Hollow Dr., Glendale, Calif. 91206

[21] Appl. No.: 950,273

[22] Filed: Oct. 11, 1978

[51] Int. Cl.$^2$ ............... C08F 220/02; C08F 220/06; C08F 220/56; C08F 4/32

[52] U.S. Cl. .................................. 526/264; 264/1; 526/227; 526/228; 526/273; 526/292; 526/312; 526/923

[58] Field of Search ............... 526/264, 292, 312, 923; 264/1

[56] References Cited

U.S. PATENT DOCUMENTS

| | | | |
|---|---|---|---|
| 3,385,839 | 5/1968 | Honig et al. | 526/312 |
| 3,861,948 | 1/1975 | Samour et al. | 526/312 |
| 3,983,083 | 9/1976 | Kaetsu et al. | 526/320 |
| 4,138,446 | 2/1979 | Kawakami et al. | 526/292 |

FOREIGN PATENT DOCUMENTS 1524899 9/1978 United Kingdom.

Primary Examiner—Joseph L. Schofer
Assistant Examiner—Herbert J. Lilling
Attorney, Agent, or Firm—Knobbe, Martens, Olson, Hubbard & Bear

[57] ABSTRACT

A novel hydrogel soft contact lens and a process for preparation thereof is disclosed which employs quaternary ammonium salts as a co-monomer which provide control over the percent of hydration with as high as 85% hydration obtainable in the resulting lens.

1 Claim, No Drawings

PROCESS FOR PREPARING HYDROGEL CONTACT LENSES CONTAINING QUATERNARY AMMONIUM SALTS

BACKGROUND OF THE INVENTION

This invention generally relates to soft contact lenses and particularly those well known in the art as hydrogel lenses.

Conventional contact lenses are hard lenses polymerized using the principal co-monomer, methyl methacrylate. Hard lenses suffer from many disadvantages, however. One of the principal problems is discomfort to the wearer's eye after repeated periods of extended wear due to a condition called "oxygen starvation".

The epithelium of the cornea requires oxygen which is usually supplied from the oxygen dissolved in tears. However, because of the manner in which hard lenses conform to the contour of the eye, the flow of lacrimal fluid is greatly curtailed beneath the lens. This reduction in fresh lacrimal fluid is not desirable as it substantially reduces the contact of the eye with oxygen. Therefore, it is extremely important that the lens material itself be gas permeable. Hard lenses fail to admit sufficient oxygen and/or release sufficient carbon dioxide to maintain a healthy normal condition for the eye tissue and cornea covered, especially when the lens is worn continuously for extended periods of time. In other words, the conventional hard lenses cannot breathe sufficiently through the body of the lens. Due to these problems, many workers in the field have experimented with the production of soft contact lenses. Examples of such work for the purpose of improving hydrogel soft lenses is found in U.S. Pat. No. 3,957,362 to Mancini et al, U.S. Pat. No. 3,983,083 to Kaetsu et al and U.S. Pat. No. 3,988,274 to Masuhara et al and the disclosures in these patents are herewith incorporated by reference. The presently known soft contact lenses are made of hydrophilic polymers, the most common being hydroxyethyl methacrylate (known in the art as "HEMA").

The hydrogel soft contact lenses receive their flexibility from their capacity to absorb water. After machining and polishing the lenses, they are placed in a saline solution from which they absorb water and swell until equilibrium is obtained. This process allows hydrogel lenses to possess a high degree of hydration which is directly related to the mode of oxygen transport and the lenses are thereby able to provide the eye with sufficient oxygen.

An average percent hydration of the conventional soft lenses now available is approximately 35-45%. The hydration level is calculated by use of the following formula:

$$\frac{\text{Hydrated weight} - \text{dry weight}}{\text{Hydrated weight}} \times 100\%$$

In short, the more water that the lens is able to absorb, the higher the hydration percent and therefore, the better the oxygen permeability of the lens.

A problem associated with highly hydrated hydrogel lenses is that although they are able to obtain satisfactory oxygen transport levels, since they are used in the swollen state, the molecular materials of their composition are markedly reduced in mechanical strength and the resulting lenses are extremely fragile. Due to this fragileness, the thickness of the lens must be increased and, therefore, these prior art soft lenses are ill-suited for the preparation of ultra-thin corneal lenses. By increasing the thickness of the lens, the gas permeability of the lens is thereby decreased forming a vicious cycle between gas permeability and strength.

In making an ultra-thin lens, the greater the strength and the greater the refractive index of the material used, the better the resulting thin lens.

The disclosed invention obviates the above deficiency in the prior art by providing a co-monomer mixture suitable for producing hydrogel contact lenses which have a superiorly high strength and refractive index, which can withstand sterilization, and, in addition, offer superior gas permeability. A further advantage of these materials, especially the more hydrophilic ones, lies in the fact that lenses made of these materials have a much lesser tendency to dehydrate while on the eye. These properties make the fabrication of and the wearing of an ultra-thin lens a practical reality.

SUMMARY OF THE INVENTION

A novel hydrogel soft contact lens is disclosed which is formed from co-polymerizing a mixture of:

(a) 5% to 80% of a group 1 monomer which is a quaternary ammonium salt; and (b) 1% to 50% of a group 2 monomer which is a molecule selected from the group consisting of a styrene, alkyl acrylate, alkyl methacrylate, aryl acrylate, aryl methacrylate or aryl vinyl ether; and (c) up to 10% of a group 3 monomer which is a cross-linking agent; and (d) the balance being a group 4 monomer which is a hydrophilic molecule selected from the group consisting of a hydroxy lower alkyl acrylate or methacrylate, a hydroxy lower alkoxy lower alkyl acrylate or methacrylate, or a lower alkoxy lower alkyl acrylate or methacrylate.

Optionally, up to 10% of a group 5 monomer which is an unsaturated aliphatic monomeric acid having at least one carboxyl group in its molecule can be added.

Using the above formulation, soft contact lenses result which have hydration levels of 35% to 85%, exhibit excellent strength and possess good optics and machineability. The lens is prepared using conventional lens production techniques.

The disclosed invention is therefore, a contact lens possessing all of the following properties:

(1) a lens with outstanding gas permeability due to its ability to tolerate a very high degree of hydration;

(2) a lens with outstanding strength and toughness despite the extremely high hydration and thin cross-section;

(3) a lens material whose gas permeability can be further enhanced through the use of styrene monomers which are by nature, gas permeable.

DESCRIPTION OF THE PREFERRED EMBODIMENTS

The hydrogel contact lens of the disclosed invention is formed from co-polymerizing a group of several co-monomers.

The group 1 monomers which represent quaternary ammonium salts play a major role in producing the outstanding characteristics of the resulting lenses. The quaternary ammonium salts permit extremely high levels of hydration, i.e., as high as 85%. These high hydration levels in turn permit the addition of the group 2 monomers to the monomer mixture which provide outstanding strength to the resulting lens and yet do not reduce the hydration level to any signifcant degree. One would normally expect a significant drop in the hydration percentage when adding such materials as alkyl methacrylate monomers, however, the presence of the quaternary ammonium salts maintain these high levels of hydration. The resulting lens, therefore, possesses a combination of high hydration and strength not achieved by prior methods.

The amount of quaternary ammonium salt which can be added to the mixture is 5% to about 80%. Hydration levels will rise with higher percentages of the salt. At about 5% the hydration level will be about 35%. A preferred amount of salt is 45% to 60% which provides hydration levels of about 60% to 85%.

The formula of the quaternary ammonium salts contemplated by the present invention is as follows:

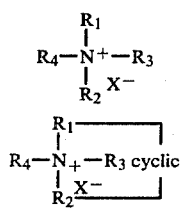

wherein $X^-$ is a negative ion such as halogen, preferably chloride and n is an integer of 1 or more.

(3) or a chain containing more than one quaternary nitrogen and having at least one such nitrogen possessing an $R_4$ substituent and one such nitrogen possessing an $R_3$ substituent.

$R_1$ and $R_2$ are not critical substituents. They may be alkyls such as ethyl, propyl, butyl, pentyl, heptyl, hexyl, etc., or alkoxy alkyls such as ethoxyethyl, methoxyethyl, propoxyethyl, butoxyethyl, pentoxyethyl, etc., or hydroxy alkyls such as hydroxyethyl, hydroxypropyl, hydroxybutyl, hydroxypentyl, hydroxyhexyl, etc., or halogenated alkoxy alkyls. $R_1$ and $R_2$ may also be alicyclics such as cyclopropyl, cyclobutyl, cyclopentyl, cyclohexyl, cycloheptyl, and cyclooctyl or aromatics such as phenyl or substituted phenyls. In addition, the $R_1$ and/or $R_2$ group may be identical to the hydrophilic $R_3$ substituent discussed hereinafter. $R_1$ and $R_2$ may be part of a cyclic structure such as piperidine, morpholine or piperazine as shown in (2).

$R_3$ is a polymerizable vinyl group. The term "polymerizable vinyl group" as used in this disclosure means a substituent providing a carbon-carbon double bond such that the molecule to which it is attached may be polymerized, such as vinyls per se, acrylates, methacrylates, acrylamides or methacrylamides.

Examples of reactants which form the vinyl per se functional group are vinyl ethers such as ethyl vinyl ether, propyl vinyl ether and analogs of the above including allyl, crotyl, etc., analogs.

Examples of reactants which form the acrylate functional group are dimethylaminoethyl acrylates, dimethylaminopropyl acrylate, dimethylaminobutyl acrylate and analogs of all of the above.

Examples of reactants which form the methacrylate functional group are dimethylamino methacrylate, dimethylaminopropyl acrylate and analogs of all of the above.

Examples of reactant which form the acrylamide functional group are dimethylaminoethyl acrylamides, dimethylaminopropyl acrylamide, and analogs of all of the above.

Examples of reactants which form the methacrylamide functional group are dimethylaminopropyl methacrylamide, dimethylaminoethyl methacrylamide, and the diethylamino and methylethylamino analogs of all of the above. Difunctional methacrylamides are also contemplated such as aminoethyliminoethyl dimethacrylamide, aminopropyliminoethyl dimethacrylamide, etc., and aminopropylpiperazineopropyl dimethacrylamide.

It has been found however, that the amides and vinyls per se show greater hydrolytic stability and are, therefore, preferred over the acrylates or methacrylates.

$R_4$ represents a hydrophilic substituent. "Hydrophilic substituent" is herein defined as a keto alkyl, carboxamide alkyl, carboxy alkyl, carbalkoxy alkyl, hydroxy alkyl, alkoxy alkyl, aryl alkyl, or aryloxy alkyl functional group and is intended to include mono, di and tri hydroxyl substituents. The $R_4$ groups are formed from compounds such as 3-chloropropanediol-1, 2, propiolactone, chloroacetamide, 2-chloroethanol, 3-chloro-1-methoxy-2-hydroxypropane and 3-chloro-2-methoxy-1-hydroxypropane, etc.

The salts are formed from a Lewis acid and base as is well known in the art. Examples of these reactants and the formulations of the salts are as follows:

(1) The quaternary salt of dimethylaminopropyl methacrylamide and 3-chloropropanediol-1,2 is:

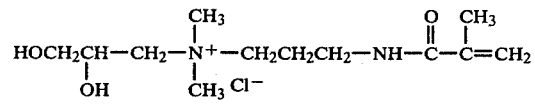

(2) The quaternary salt of dimethylaminopropyl methacrylamide and 2-chloroethanol is:

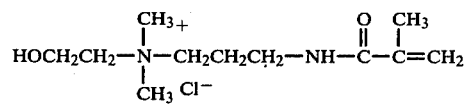

(3) The quaternary salt of dimethylaminopropyl methacrylamide and 3-chloro-1-methoxy-2-hydroxy propane is:

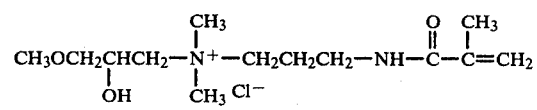

(4) The quaternary salt of dimethylaminopropyl methacrylamide and 3-chloro-2-methoxy-1-hydroxypropane is:

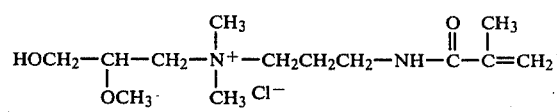

(5) The quaternary salt of dimethylaminoethyl methacrylate and 3-chloropropanediol-1,2 is:

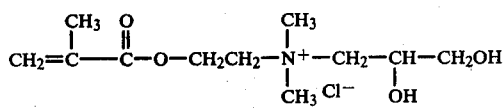

(6) The quaternary salt of dimethylaminoethyl methacrylate and 2-chloroethanol is:

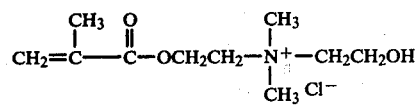

(7) The quaternary salt of aminopropyliminopropyl methacrylamide and chloroethanol is:

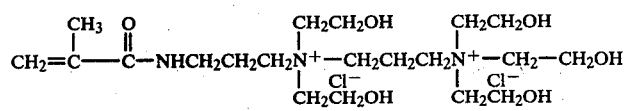

The propylimino unit may be repeated to form long chains.

Other examples of the salts are:

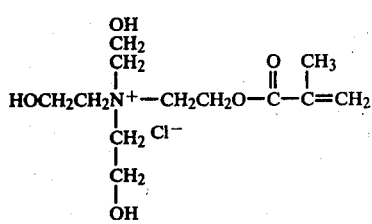

formed from 2-chloroethyl methacrylate and triethanol amine and

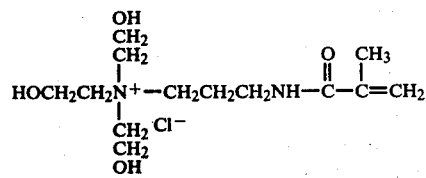

The group 2 monomers are strength enhancing materials. These monomers which provide excellent durability to the lenses do not curtail hydration percentage due to the presence of the quaternary ammonium salt. The percentage of the group 2 monomer is about 1% to as high as 50%. Examples of the group 2 monomers are styrenes, alkyl acrylates or alkyl methacrylates, aryl acrylates or methacrylates and aryl vinyl ethers. These monomers are known to possess the desired strength enhancing property. See Applicant's earlier filed, copending application Ser. No. 920,670, filed June 30, 1978, entitled STYRENE COPOLYMER FOR CONTACT LENSES. As long as this property is present, the particular group 2 monomer which is chosen is not critical although styrene monomers have the added advantage of being gas permeable as well.

"Styrene monomers" are herein defined as any form of styrene or substituted styrenes such as alpha-alkyl styrenes or vinyl toluene or a like alkylated or halogenated styrene.

Alkyl acrylates or methacrylates are well known in the art and include methyl acrylate, ethyl acrylate, isopropyl acrylate, propyl acrylate, butyl acrylate, sec. butyl acrylate, pentyl acrylate, 2-ethylhexyl acrylate, methyl methacrylate, ethyl methacrylate, propyl methacrylate, isopropyl methacrylate, butyl methacrylate, sec. butyl methacrylate, pentyl methacrylate, and cyclohexyl methacrylate.

Examples of aryl acrylates and methacrylates are phenyl acrylate, phenyl methacrylate, etc. An example of a phenyl vinyl ether is:

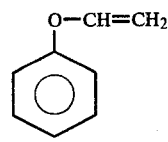

The group 3 monomer is a cross-linking agent which provides the desired strength and may be added up to 10% of the monomer mixture, preferably about 1%. The cross-linking agents are well known to those in the art and are exemplified by diethylene glycol dimethacrylate, triethylene glycol dimethacrylate, tetraethylene glycol dimethacrylate, polyethylene glycol dimethacrylates, butylene glycol dimethacrylate, neopentyl glycol dimethacrylate, diethylene glycol bisallycarbonate, 2,3 epoxy propyl methacrylate, divinyl benzene, ethylene glycol diacrylate, ethylene glycol dimethacrylate, 1,3-butylene dimethacrylate, 1,3-butylene dimethacrylate, 1,4-butylene dimethacrylate, propylene glycol diacrylate, propylene glycol dimethacrylate, diethylene glycol dimethacrylate, dipropylene glycol dimethacrylate, diethylene glycol diacrylate, dipropylene glycol diacrylate.

These polyfunctional monomers are added to effect the stabilization of the polymer and the stabilization of the lens by forming a three-dimensional structure.

The cross-linking comonomer may also include quaternary ammonium salts in the molecule. Diacrylates, dimethacrylates, diacrylamides and dimethacrylamides as shown below are examples:

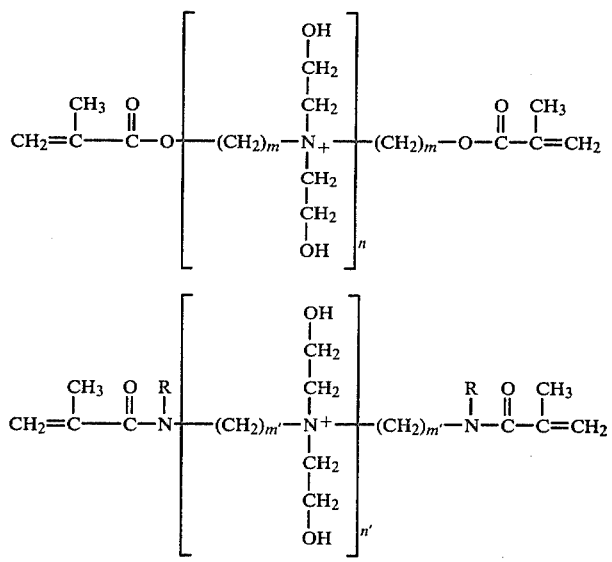

m may be 2 to 20 and n may be 1 to 100; m' may be 1 to 20 and n' may be 1 to 100; and R may be hydrogen, alkyl or aryl; such cross-linking comonomers will enhance hydration.

Applicant's application, Ser. No. 797,295, entitled SYMMETRIC HYDROGEL MATRIX FOR CONTACT LENSES, filed May 16, 1977, in part discloses a new type of cross-linker which enhances hydration since the chain of the hydrophilic glycol is lengthened thereby providing a more hydrophilic cross-linking agent and one which will not spacially restrict the hydration process.

The group 4 monomers represent a class of hydrophilic monomers which provide the principal comonomer with the quaternary ammonium salt co-monomer. These hydrophilic monomers are well known to those in the art and generally represent the various hydrophilic acrylates and methacrylates which are conventionally used in the present hydrogel lenses. More specifically, these monomers are hydroxy lower alkyl acrylates or methacrylates, hydroxy lower alkoxy lower alkyl acrylates or methacrylates, and alkoxy lower alkyl acrylates and methacrylates. A "lower alkyl" or "lower alkoxy" is herein defined to mean an alkyl or alkoxy of about five carbon atoms or less. The group 4 monomers include hydrophilic dihydroxy and trihydroxy alkyl acrylates and methacrylates such as 2,3 dihydroxypropyl methacrylates or 2,3 dihydroxybutyl methacrylates, etc.

Examples of other group 4 monomers are hydroxy substituted or alkoxy substituted methacrylates or acrylates. The hydroxy substituted acrylates or methacrylates are generally disclosed and discussed in U.S. Pat. No 3,983,083 issued to Kaetsu et al, which is herewith incorporated by reference.

Other group 4 monomers are generally alkylene glycol monomethacrylates or acrylates. These are generally discussed in U.S. Pat. No. 3,988,274 issued to Masuhara et al which is herewith incorporated by reference. Examples of these monomers are hydroxyethyl methacrylate (HEMA), hydroxyethyl acrylate, hydroxypropyl methacrylate, hydroxypropyl acrylate, butanediol monomethacrylate, butanediol monoacrylate.

The most preferred monomers are the hydroxy alkyl acrylates and methacrylates, particularly 2-hydroxyethyl methacrylate.

The group 5 monomer can optionally be added to the polymerization mixture. This monomer aids in hydration and facilitates machining and polishing by providing dry state hardness. It represents monomers having at least one carboxyl group in their molecule and are exemplified by acrylic acid, methacrylic acid and itaconic acid, but are not limited to these compounds so long as at least one carboxyl group is present. This component further increases the hydration of the resulting lens. Up to 10% of this monomer may be added.

A polymerization catalyst or initiator can also be added to the monomer mixture in order to promote the polymerization. These initiators are well known to those in the art and are for example, benzoyl peroxide, lauroyl peroxide, cumene hydro peroxide, di-tert-butyl peroxide, diisopropyl peroxycarbonate, azobisisobutyronitrole, t-butyl peroctoate, t-butyl perneodecanoate, t-butyl perpivalate, 2,5-dimethyl hexane 2,5-diper-2-ethylhexoate or the like.

The monomers are mixed conventionally and placed in an oven to begin the polymerization (curing). Such polymerization is carried out conventionally between 40° C. and 100° C. Preferably, the mixture is cured in the molds at about 65° C. for about 1 to 4 hours to form cylindrical lens blanks. The blanks are then annealed for several hours at approximately 85° C. The lenses are then cut, polished and hydrated in saline solution to form highly hydrated hydrogel soft contact lenses.

The following working examples are illustrative only and are not to be construed as limiting the scope of the invention. The lenses were prepared conventionally as outlined above unless otherwise specified. The experiments are summarized in Table 1 which follows the final example.

Example 1 (74% Hydration)

| | |
|---|---|
| Methoxyethyl Methacrylate | 4.00g |
| Vinyl Toluene | 4.00g |
| 2-Hydroxyethyl Methacrylate | 0.50g |
| Quaternary Salt of 3-Chloropropanediol-1, | |

| | |
|---|---|
| 2 and Dimethylaminopropyl Methacrylamide | 9.70g |
| Methacrylic Acid | 1.60g |
| Triethyleneglycol Dimethacrylate | 0.20g |
| 2,5-Dimethyl Hexane-2, 5-diper-2-ethylhexoate (U.S. Peroxygen Division, Witco Chemical Company, U.S.P. 245) | 2 drops |
| Tertiarybutyl Perneodecanoate (U.S. Peroxygen Division, Witco Chemical Company, Esperox 33M) | 2 drops |

The above were blended and cured at 63°–68° C. for 4 hours and an additional 15 hours at 88°–94° C. The lens blanks from this formulation had a hydration level of 74.0%, good clarity and good hardness dry

Example 2 (68.5% Hydration)

| | |
|---|---|
| Methoxyethyl Methacrylate | 3.00g |
| Vinyl Toluene | 5.00g |
| 2-Hydroxyethyl Methacrylate | 0.50g |
| Quaternary Salt of 3-chloro-propanediol-1, 2 and Dimethylaminopropyl Methacrylamide | 9.70g |
| Methacrylic Acid | 1.60g |
| Triethyleneglycol Dimethacrylate | 0.20g |
| 2,5-Dimethyl Hexane-2, 5-diper-2-ethylhexoate (U.S. Peroxygen Division, Witco Chemical Company, U.S.P. 245) | 2 drops |
| Tertiarybutyl Perneodecanoate (U.S. Peroxygen Division, Witco Chemical Company, Esperox 33M) | 2 drops |

The above were blended and cured 1 hour and 45 minutes at 65°–77° C. and 30 minutes at 75°–88° C. and 15 hours at 88°–94° C. The lens blank had a hydration level of 68.5%, excellent hardness, machineability and optical clarity.

Example 3 (70.0% Hydration)

| | |
|---|---|
| Methoxyethyl Methacrylate | 2.00g |
| Vinyl Toluene | 6.00g |
| 2-Hydroxyethyl Methacrylate | 0.50g |
| Quaternary Salt of 3-Chloropropanediol-1, 2 and Dimethylaminopropyl Methacrylamide | 9.70g |
| Methacrylic Acid | 1.60g |
| Triethyleneglycol Dimethacrylate | 0.20g |
| 2,5-Dimethyl Hexane-2, 5-diper-2-Ethylhexoate (U.S. Peroxygen Division, Witco Chemical Company, U.S.P. 245) | 2 drops |
| Tertiarybutyl Perneodecanoate (U.S. Peroxygen Division, Witco Chemical Company, Esperox 33M) | 2 drops |

The above were blended and cured at 69°–77° C. for 5 hours and 20 minutes and at 77°–85° C. for 15 hours and 45 minutes. The lens blanks had an equilibrium hydration level of 70.0%.

Example 4 (70% Hydration)

| | |
|---|---|
| Methoxyethyl Methacrylate | 2.00 g |
| Vinyl Toluene | 6.00 g |
| 2-Hydroxyethyl Methacrylate | 0.50 g |
| Quaternary Salt of 3-Chloropropanediol-1, 2 and Dimethylaminopropyl Methacrylamide | 10.50 g |
| Methacrylic Acid | 0.80 g |
| Triethyleneglycol Dimethacrylate | 0.20 g |
| 2,5-Dimethyl Hexane-2, 5-diper-2-Ethylhexoate (U.S. Peroxygen Division, Witco Chemical Company, U.S.P. 245) | 2 drops |
| Tertiarybutyl Perneodecanoate (U.S. Peroxygen Division, Witco Chemical Company, Esperox 33M) | 2 drops |

The above were blended and cured at 70°–77° C. for 2 hours and 37 minutes and 77°–87° C. for 15 hours and 45 minutes. The lens blanks had a hydration level of 70.0%.

Example 5 (75.6% Hydration)

| | |
|---|---|
| Methoxyethyl Methacrylate | 2.00 g |
| Vinyl Toluene | 6.00 g |
| 2-Hydroxyethyl Methacrylate | 0.50 g |
| Quaternary Salt of 3-Chloropropanediol-1, 2 and Dimethylaminopropyl Methacrylamide | 10.90 g |
| Methacrylic Acid | 0.40 g |
| Triethyleneglycol Dimethacrylate | 0.20 g |
| 2,5-Dimethyl Hexane-2, 5-diper-2-Ethylhexoate (U.S. Peroxygen Division, Witco Chemical Company, U.S.P. 245) | 2 drops |
| Tertiarybutyl Perneodecanoate (U.S. Peroxygen Division, Witco Chemical Company, Esperox 33M) | 2 drops |

The above were blended and cured at 62°–72° C. for 3 hours and 52 minutes and 15 hours at 82°–87° C. The lens blanks had a hydration level of 75.6%.

Example 6 (81.5% Hydration)

| | |
|---|---|
| Methoxyethyl Methacrylate | 2.00g |
| Vinyl Toluene | 6.00g |
| 2-Hydroxy Methacrylate | 0.50g |
| Quaternary Salt of 3-Chloropropanediol-1, 2 and Dimethylaminopropyl Methacrylamide | 11.30g |
| Triethyleneglycol Dimethacrylate | 0.20g |
| 2,5-Dimethyl Hexane-2, 5-diper-2-Ethylhexoate (U.S. Peroxygen Division, Witco Chemical Company, U.S.P. 245) | 2 drops |
| Tertiarybutyl Perneodecanoate (U.S. Peroxygen Division, Witco Chemical Company, Esperox 33M) | 2 drops |

The above were blended and cured at 62°–70° C. for 2 hours and 24 minutes and for 15 hours at 82°–87° C. The lens blanks had an equilibrium hydration level of 81.5%.

Example 7 (84.5% Hydration)

| | |
|---|---|
| Methoxyethyl Methacrylate | 2.00g |
| Vinyl Toluene | 6.00g |
| Quaternary Salt of 3-Chloropropanediol-1, 2 and Dimethylaminopropyl Methacrylamide | 11.80g |
| Triethyleneglycol Dimethacrylate | 0.20g |
| 2,5-Dimethyl Hexane-2, 5-diper-2-Ethylhexoate (U.S. Peroxygen Division, Witco Chemical Company, U.S.P. 245) | 2 drops |
| Tertiarybutyl Perneodecanoate (U.S. Peroxygen Division, Witco Chemical Company, Esperox 33M) | 2 drops |

The above were blended and cured at 68°–70° C. for 1 hour and 30 minutes and at 69°–87° C. for 40 minutes and at 82°–87° C. 14 hours and 10 minutes. The lens blanks had an hydration level of 84.5%.

Example 8 (64.3% Hydration)

| | |
|---|---|
| Methoxyethyl Methacrylate | 3.00g |
| Vinyl Toluene | 5.00g |

-continued

| | |
|---|---|
| 2-Hydroxyethyl Methacrylate | 1.00g |
| Quaternary Salt of 3-Chloropropanediol-1, 2 and Dimethylaminopropyl Methacrylamide | 9.20g |
| Methacrylic Acid | 1.60g |
| Triethyleneglycol Dimethacrylate | 0.20g |
| 2,5-Dimethyl Hexane-2, 5-diper-2-Ethylhexoate (U.S. Peroxygen Division, Witco Chemical Company, U.S.P. 245) | 2 drops |
| Tertiarybutyl Perneodecanoate (U.S. Peroxygen Division, Witco Chemical Company, Esperox 33M) | 2 drops |

The above were blended and cured at 67°–78° C. for 3 hours and 15 hours at 82°–87° C. The lens blanks had a hydration level of 64.3%.

Example 9 (55.6% Hydration)

| | |
|---|---|
| Methoxyethyl Methacrylate | 2.00g |
| Vinyl Tolune | 6.00g |
| 2-Hydroxyethyl Methacrylate | 1.00g |
| Quaternary Salt of 3-Chloropropanediol-1, 2 and Dimethylaminopropyl Methacrylamide | 9.20g |
| Methacrylic Acid | 1.60g |
| Triethyleneglycol Dimethacrylate | 0.20g |
| 2,5-Dimethyl Hexane-2, 5-diper-2-Ethylhexoate (U.S. Peroxygen Division, Witco Chemical Company, U.S.P. 245) | 2 drops |
| Tertiarybutyl Perneodecanoate (U.S. Peroxygen Division, Witco Chemical Company, Esperox 33M) | 2 drops |

The above were blended and cured at 65°–70° C. for 1 hour and 45 minutes and for 15 hours at 82°–87° C. The lens blanks had a hydration level of 55.6%, with a slight haze.

Example 10 (59.1% Hydration)

| | |
|---|---|
| Methoxyethyl Methacrylate | 3.00g |
| Vinyl Toluene | 5.00g |
| 2-Hydroxyethyl Methacrylate | 2.00g |
| Quaternary Salt of 3-Chloropropanediol-1, 2 and Dimethylaminopropyl Methacrylamide | 8.20g |
| Methacrylic Acid | 1.60g |
| Triethyleneglycol Dimethacrylate | 0.20g |
| 2,5-Dimethyl Hexane-2, 5-diper-2-Ethylhexoate (U.S. Peroxygen Division, Witco Chemical Company, U.S.P. 245) | 2 drops |
| Tertiarybutyl Perneodecanoate (U.S. Peroxygen Division, Witco Chemical Company, Esperox 33M) | 2 drops |

The above were blended and cured at 69°–82° C. for 4 hours and 15 hours at 82°–87° C. The blanks had a hydration level of 59.1%.

Example 11 (80.7% Hydration)

| | |
|---|---|
| Methoxyethyl Methacrylate | 6.00g |
| Vinyl Tolune | 2.00g |
| 2-Hydroxyethyl Methacrylate | 0.50g |
| Quaternary Salt of 3-Chloropropanediol-1, 2 and Dimethylaminopropyl Methacrylamide | 9.70g |
| Methacrylic Acid | 1.60g |
| Triethyleneglycol Dimethacrylate | 0.20g |
| 2,5-Dimethyl Hexane-2, 5-diper-2-Ethylhexoate (U.S. Peroxygen Division, Witco Chemical Company, U.S.P. 245) | 2 drops |
| Tertiarybutyl Perneodecanoate (U.S. Peroxygen Division, Witco Chemical Company, Esperox 33M) | 2 drops |

The above were blended and cured at 70°–84° C. for 1 hour and 20 minutes and 15 hours at 82°–87° C. The blanks had a hydration level of 80.7%.

| | |
|---|---|
| Methyl Methacrylate | 0.60g |
| 2-Hydroxyethyl Methacrylate | 18.20g |
| Quaternary Salt of Dimethylaminoethyl Methacrylate and 3-Chloropropanediol-1,2 | 1.00g |
| Triethyleneglycol Dimethacrylate | 0.20g |
| 2,5-Dimethyl Hexane-2, 5-diper-2-Ethylhexoate (U.S. Peroxygen Division, Witco Chemical Company, U.S.P. 245) | 2 drops |
| Tertiarybutyl Perneodecanoate (U.S. Peroxygen Division, Witco Chemical Company, Esperox 33M) | 2 drops |

The above were blended and cured for one hour and 30 minutes at 68°–87° C. The lens blanks had a hardness of 85D and a hydration level of 35.7%.

Example 13

| | |
|---|---|
| Methyl Methacrylate | 0.60g |
| 2-Hydroxyethyl Methacrylate | 15.20g |
| Quaternary Salt of Dimethylaminoethyl Methacrylate and 3-Chloropropanediol-1,2 | 4.00g |
| Triethyleneglycol Dimethacrylate | 0.20g |
| 2,5-Dimethyl Hexane-2, 5-diper-2-Ethylhexoate (U.S. Peroxygen Division, Witco Chemical Company, U.S.P. 245) | 2 drops |
| Tertiarybutyl Perneodecanoate (U.S. Peroxygen Division, Witco Chemical Company, Esperox 33M) | 2 drops |

The above were blended and cured at 69°–84° C. for one hour and 30 minutes. The blanks had a hardness of 80D and a hydration level of 65.5%.

Example 14

| | |
|---|---|
| Styrene | 8.00g |
| 2-Hydroxyethyl Methacrylate | 8.00g |
| Quaternary Salt of Dimethylaminoethyl Methacrylate and 3-Propanediol-1,2 | 4.00g |
| Triethyleneglycol Dimethacrylate | 0.20g |
| 2,5-Dimethyl Hexane-2, 5-diper-2-Ethylhexoate (U.S. Peroxygen Division, Witco Chemical Company, U.S.P. 245) | 2 drops |
| Tertiarybutyl Perneodecanoate (U.S. Peroxygen Division, Witco Chemical Company, Esperox 33M) | 2 drops |

The above were blended and cured at 69°–80° C. and 15 hours at 85° C. The buttons had a hardness of 83D.

Example 15

| | |
|---|---|
| Methoxyethyl Methacrylate | 8.00g |
| 2-Hydroxyethyl Methacrylate | 8.00g |
| Quaternary Salt of Dimethylaminoethyl Methacrylate and 3-Chloropropanediol-1,2 | 4.00g |
| Triethyleneglycol Dimethacrylate | 0.20g |
| 2,5-Dimethyl Hexane-2, 5-diper-2-Ethylhexoate (U.S. Peroxygen Division, Witco Chemical Company, U.S.P. 245) | 2 drops |
| Tertiarybutyl Perneodecanoate (U.S. Peroxygen Division, Witco Chemical Company, Esperox 33M) | 2 drops |

The above were blended and cured at 69°–77° C. for one hour and 30 minutes.

Example 16

| | |
|---|---|
| Methoxyethyl Methacrylate | 8.00g |
| 2-Hydroxyethyl Methacrylate | 10.00g |
| Quaternary Salt of Dimethylaminoethyl Methacrylate and 3-Chloropropanediol-1,2 | 2.00g |
| Triethyleneglycol Dimethacrylate | 0.20g |
| 2,5-Dimethyl Hexane-2, 5-diper-2-Ethylhexoate (U.S. Peroxygen Division, Witco Chemical Company, U.S.P. 245) | 2 drops |
| Tertiarybutyl Perneodecanoate (U.S. Peroxygen Division, Witco Chemical Company, Esperox 33M) | 2 drops |

The above were blended and cured at 63°–86° C. for two hours.

Example 17

| | |
|---|---|
| Methoxyethyl Methacrylate | 8.00g |
| 2-Hydroxyethyl Methacrylate | 10.00g |
| Quaternary Salt of Dimethylaminoethyl Methyacrylate and 2-Chloroethanol | 2.00g |
| Triethyleneglycol Dimethacrylate | 0.20g |
| 2,5-Dimethyl Hexane-2, 5-diper-2-Ethylhexoate (U.S. Peroxygen Division, Witco Chemical Company, U.S.P. 245) | 2 drops |
| Tertiarybutyl Perneodecanoate (U.S. Peroxygen Division, Witco Chemical Company, Esperox 33M) | 2 drops |

The above were blended and cured at 63°–86° C. for two hours.

Example 18

| | |
|---|---|
| Methoxyethyl Methacrylate | 2.00g |
| Vinyl Toluene | 6.00g |
| 2-Hydroxyethyl Methacrylate | 8.00g |
| Quaternary Salt of Dimethylaminopropyl Methacrylamide and 2-Chloroethanol | 3.00g |
| Methacrylic Acid | 0.80g |
| Polyethyleneglycol Dimethacrylate | 0.20g |
| 2,5-Dimethyl Hexane-2, 5-diper-2-Ethylhexoate (U.S. Peroxygen Division, Witco Chemical Company, U.S.P. 245) | 2 drops |
| Tertiarybutyl Perneodecanoate (U.S. Peroxygen Division, Witco Chemical Company, Esperox 33M) | 2 drops |

The above were blended and cured for 3 hours at 61°–77° C. and 15 hours and 30 minutes at 90° C.

Example 19

| | |
|---|---|
| Methoxyethyl Methacrylate | 2.00g |
| Vinyl Toluene | 6.00g |
| 2-Hydroxyethyl Methacrylate | 8.00g |
| Quaternary Salt of Dimethylaminopropyl Methacrylamide and 3-Chloropropanediol-1,2 | 3.00g |
| Methacrylic Acid | 0.80g |
| Polyethyleneglycol Dimethacrylate | 0.20g |
| 2,5-Dimethyl Hexane-2, 5-diper-2-Ethylhexoate (U.S. Peroxygen Division, Witco Chemical Company, U.S.P. 245) | 2 drops |
| Tertiarybutyl Perneodecanoate (U.S. Peroxygen Division, Witco Chemical Company, Esperox 33M) | 2 drops |

The above were blended and cured for 2 hours at 61°–77° C. and 15 hours and 30 minutes at 90° C.

Example 20

| | |
|---|---|
| Methoxyethyl Methacrylate | 2.00g |
| Vinyl Toluene | 6.00g |
| 2-Hydroxyethyl Methacrylate | 5.00g |
| Quaternary Salt of Dimethylaminopropyl Methacrylamide and 3-Chloropropanediol-1,2 | 6.00g |
| Methacrylic Acid | 0.80g |
| Polyethyleneglycol Dimethacrylate | 0.20g |
| 2,5-Dimethyl Hexane-2, 5-diper-2-Ethylhexoate (U.S. Peroxygen Division, Witco Chemical Company, U.S.P. 245) | 2 drops |
| Tertiarybutyl Perneodecanoate (U.S. Peroxygen Division, Witco Chemical Company, Esperox 33M) | 2 drops |

The above were blended and cured at 63°–76° C. for 2 hours and 25 minutes and 90° C. for 15 hours. The material was strong in the hydrated state, hydration level of 35.7%. The material was strong enough to give a good soft lens with 0.078 mm center thickness in the hydrated state.

Example 21

| | |
|---|---|
| Methoxyethyl Methacrylate | 4.00g |
| Vinyl Toluene | 4.00g |
| 2-Hydroxyethyl Methacrylate | 5.20g |
| Quaternary Salt of Dimethylaminopropyl Methacrylamide and 3-Chloropropanediol-1,2 | 5.00g |
| Methacrylic Acid | 1.60g |
| Polyethyleneglycol Dimethacrylate | 0.20g |
| 2,5-Dimethyl Hexane-2, 5-diper-2-Ethylhexoate (U.S. Peroxygen Division, Witco Chemical Company, U.S.P. 245) | 2 drops |
| Tertiarybutyl Perneodecanoate (U.S. Peroxygen Division, Witco Chemical Company, Esperox 33M) | 2 drops |

The above were blended and cured at 64°–77° C. for 4 hours. The material was strong, had a hydration level of 38.5%.

Example 22

| | |
|---|---|
| Methoxyethyl Methacrylate | 4.00g |
| Vinyl Toluene | 4.00g |
| 2-Hydroxyethyl Methacrylate | 4.00g |
| Quaternary Salt of Dimethylaminopropyl Methacrylamide and 3-Chloropropanediol-1,2 | 6.20g |
| Methacrylic Acid | 1.60g |
| Polyethyleneglycol Dimethacrylate | 0.20g |
| 2,5-Dimethyl Hexane-2, 5-diper-2-Ethylhexoate (U.S. Peroxygen Division, Witco Chemical Company, U.S.P. 245) | 2 drops |
| Tertiarybutyl Perneodecanoate (U.S. Peroxygen Division, Witco Chemical Company, Esperox 33M | 2 drops |

The above were blended and cured at 64°–82° C. for 4 hours and 30 minutes and 15 hours and 40 minutes at 93° C.

Example 23

| | |
|---|---|
| Methoxyethyl Methacrylate | 4.00g |
| Vinyl Toluene | 4.00g |
| 2-Hydroxyethyl Methacrylate | 2.00g |
| Quaternary Salt of Dimethylaminopropyl Methacrylamide and 3-Chloropropanediol-1,2 | 8.20g |
| Methacrylic Acid | 1.60g |
| Triethyleneglycol Dimethacrylate | 0.20g |
| 2,5-Dimethyl Hexane-2, 5-diper-2- | |

-continued

| | |
|---|---|
| Ethylhexoate (U.S. Peroxygen Division, Witco Chemical Company, U.S.P. 245) | 2 drops |
| Tertiarybutyl Perneodecanoate (U.S. Peroxygen Division, Witco Chemical Company, Esperox 33M) | 2 drops |

The above were blended and cured for 1 hour and 50 minutes at 65°–76° C. and for 15 hours and 40 minutes at 93° C.

Example 24

| | |
|---|---|
| Methoxyethyl Methacrylate | 4.00g |
| Vinyl Toluene | 4.00g |
| 2-Hydroxyethyl Methacrylate | 1.00g |
| Quaternary Salt of Dimethylaminopropyl Methacrylamide and 3-Chloropropanediol-1,2 | 9.20g |
| Methacrylic Acid | 1.60g |
| Triethyleneglycol Dimethacrylate | 0.20g |
| 2,5-Dimethyl Hexane-2, 5-diper-2-Ethylhexoate (U.S. Peroxygen Division, Witco Chemical Company, U.S.P. 245) | 2 drops |
| Tertiarybutyl Perneodecanoate (U.S. Peroxygen Division, Witco Chemical Company, Esperox 33M) | 2 drops |

The above were blended and cured at 64°–80° C. for 1 hour and 45 minutes and 16 hours at 92° C. The lens blanks had a hydration level of 71.4%.

Example 25

| | |
|---|---|
| Methoxyethyl Methacrylate | 4.00g |
| Vinyl Toluene | 4.00g |
| Quaternary Salt of Dimethylaminopropyl Methacrylamide and 3-Chloropropanediol-1,2 | 10.20g |
| Methacrylic Acid | 1.60g |
| Triethyleneglycol Dimethacrylate | 0.20g |
| 2,5-Dimethyl Hexane-2, 5-diper-2-Ethylhexoate (U.S. Peroxygen Division, Witco Chemical Company, U.S.P. 245) | 2 drops |
| Tertiarybutyl Perneodecanoate (U.S. Peroxygen Division, Witco Chemical Company, Esperox 33M) | 2 drops |

The above were blended and cured for 2 hours and 30 minutes at 66°–82° C. and 16 hours at 92° C. The blanks had a hydration level of 76.6% but were cloudy.

Example 26

| | |
|---|---|
| Methoxyethyl Methacrylate | 2.00g |
| Vinyl Toluene | 6.00g |
| 2-Hydroxyethyl Methacrylate | 2.00g |
| Quaternary Salt of Dimethylaminopropyl Methacrylamide and 3-Chloropropanediol-1,2 | 8.20g |
| Methacrylic Acid | 1.60g |
| Triethyleneglycol Dimethacrylate | 0.20g |
| 2,5-Dimethyl Hexane-2, 5-diper-2-Ethylhexoate (U.S. Peroxygen Division, Witco Chemical Company, U.S.P. 245) | 2 drops |
| Tertiarybutyl Perneodecanoate (U.S. Peroxygen Division, Witco Chemical Company, Esperox 33M) | 2 drops |

The above were blended and cured at 70°–81° C. for 3 hours and 45 minutes and 15 hours at 75°–79° C. The blanks had a hydration level of 33.7%.

Example 27

| | |
|---|---|
| Methoxyethyl Methacrylate | 6.00g |
| Vinyl Toluene | 2.00g |
| 2-Hydroxyethyl Methacrylate | 2.00g |
| Quaternary Salt of Dimethylaminopropyl Methacrylamide and 3-Chloropropanediol-1,2 | 8.20g |
| Methacrylic Acid | 1.60g |
| Triethyleneglycol Dimethacrylate | 0.20g |
| 2,5-Dimethyl Hexane-2, 5-diper-2-Ethylhexoate (U.S. Peroxygen Division, Witco Chemical Company, U.S.P. 245) | 2 drops |
| Tertiarybutyl Perneodecanoate (U.S. Peroxygen Division, Witco Chemical Company, Esperox 33M) | 2 drops |

The above were blended and cured at 65°–79° C. for 2 hours and at 75°–79° C. for 15 hours. The blanks had a hydration level of 72%.

TABLE 1

| Q Salt % | HEMA % | MMA % | MAA % | MEMA % | Vinyl Toluene % | Styrene % | TEGDMA % | PEGDMA % | Hydration % |
|---|---|---|---|---|---|---|---|---|---|
| C-5.0 | 91.0 | 3.0 | — | — | — | — | 1.0 | — | 35.7 |
| C-20.0 | 76.0 | 3.0 | — | — | — | — | 1.0 | — | 65.5 |
| C-19.8 | 39.6 | — | — | — | — | 39.6 | 1.0 | — | — |
| C-19.8 | 39.6 | — | — | 39.6 | — | — | 1.0 | — | — |
| C-9.9 | 49.5 | — | — | 39.6 | — | — | 1.0 | — | — |
| D-919 | 49.5 | — | — | 39.6 | — | — | 1.0 | — | — |
| B-15.0 | 40.0 | — | 4.0 | 10.0 | 30.0 | — | — | 1.0 | — |
| A-15.0 | 40.0 | — | 4.0 | 10.0 | 30.0 | — | — | 1.0 | — |
| A-30.0 | 25.0 | — | 4.0 | 10.0 | 30.0 | — | — | 1.0 | 35.7 |
| A-25.0 | 26.0 | — | 8.0 | 20.0 | 20.0 | — | — | 1.0 | 38.5 |
| A-31.0 | 20.0 | — | 8.0 | 20.0 | 20.0 | — | — | 1.0 | — |
| A-41.0 | 10.0 | — | 8.0 | 20.0 | 20.0 | — | 1.0 | — | — |
| A-46.0 | 5.0 | — | 8.0 | 20.0 | 20.0 | — | 1.0 | — | 71.4 |
| A-51.0 | — | — | 8.0 | 20.0 | 20.0 | — | 1.0 | — | 76.6 |
| A-41.0 | 10.0 | — | 8.0 | 10.0 | 30.0 | — | 1.0 | — | 33.7 |
| A-41.0 | 10.0 | — | 8.0 | 30.0 | 10.0 | — | 1.0 | — | 72.0 |
| A-48.5 | 2.5 | — | 8.0 | 30.0 | 10.0 | — | 1.0 | — | 80.7 |
| A-41.0 | 10.0 | — | 8.0 | 15.0 | 25.0 | — | 1.0 | — | 59.1 |
| A-46.0 | 5.0 | — | 8.0 | 10.0 | 30.0 | — | 1.0 | — | 55.6 |
| A-46.0 | 5.0 | — | 8.0 | 15.0 | 25.0 | — | 1.0 | — | 64.3 |
| A-59.0 | — | — | — | 10.0 | 30.0 | — | 1.0 | — | 84.5 |
| A-56.5 | 2.5 | — | — | 10.0 | 30.0 | — | 1.0 | — | 81.5 |
| A-54.5 | 2.5 | — | 2.0 | 10.0 | 30.0 | — | 1.0 | — | 75.6 |
| A-52.5 | 2.5 | — | 4.0 | 10.0 | 30.0 | — | 1.0 | — | 70.0 |
| A-48.5 | 2.5 | — | 8.0 | 10.0 | 30.0 | — | 1.0 | — | 70.0 |

TABLE 1-continued

| Q Salt % | HEMA % | MMA % | MAA % | MEMA % | Vinyl Toluene % | Styrene % | TEGDMA % | PEGDMA % | Hydration % |
|---|---|---|---|---|---|---|---|---|---|
| A-48.5 | 2.5 | — | 8.0 | 15.0 | 25.0 | — | 1.0 | — | 68.5 |
| A-48.5 | 2.5 | — | 8.0 | 20.0 | 20.0 | — | 1.0 | — | 74.0 |

Q Salt - Quaternary Salt
Salt A - Quaternary salt of dimethylaminopropyl acrylamide and 3-chloropropanediol-1,2
Salt B - Quaternary salt of dimethylaminopropyl methacrylamide and 2-chloroethanol
Salt C - Quaternary salt of dimethylaminoethyl methacrylate and 3-chloropropane diol-1,2
Salt D - Quaternary salt of dimethylaminoethyl methacrylate and 2-chloroethanol
HEMA - Hydroxyethyl Methacrylate
MMA - Methyl Methacrylate
MAA - Methacrylic Acid
MEMA - Methoxy Ethyl Methacrylate
TEGDMA - Triethylene Glycol Dimethacrylate
PEGDMA - Polyethylene Glycol Dimethacrylate

I claim as my invention:

1. A method for making a hydrogel soft contact lens comprising:
(a) co-polymerizing a substantially anhydrous monomer mixture consisting essentially of:
5% to 80% of a group 1 monomer which is a quaternary ammonium salt containing one or more quaternary bounded nitrogens, wherein one of said nitrogens has a polymerizable vinyl group and one or more of said nitrogens has at least one but not more than three hydrophilic substituents, and
1% to 50% of a group 2 monomer which is selected from the group consisting of styrenes, alkyl acrylates or methacrylates, aryl acrylates or methacrylates, and aryl vinyl ethers; and
up to 10% of a group 3 monomer which is a cross-linking agent; and
the balance being a group 4 monomer which is a hydrophilic molecule selected from the group consisting of hydroxyl lower alkyl acrylates or methacrylates, alkoxy lower alkyl acrylates or methacrylates, and hydroxy lower alkoxy lower alkyl acrylates or methacrylates, to form a solid lens blank; and
(b) mechanically forming the resulting polymer into a lens shape.

* * * * *